Aug. 25, 1959  J. L. HOBIN  2,900,763
APPARATUS FOR THERMOMETER MANUFACTURE
Filed Feb. 28, 1955  3 Sheets-Sheet 1
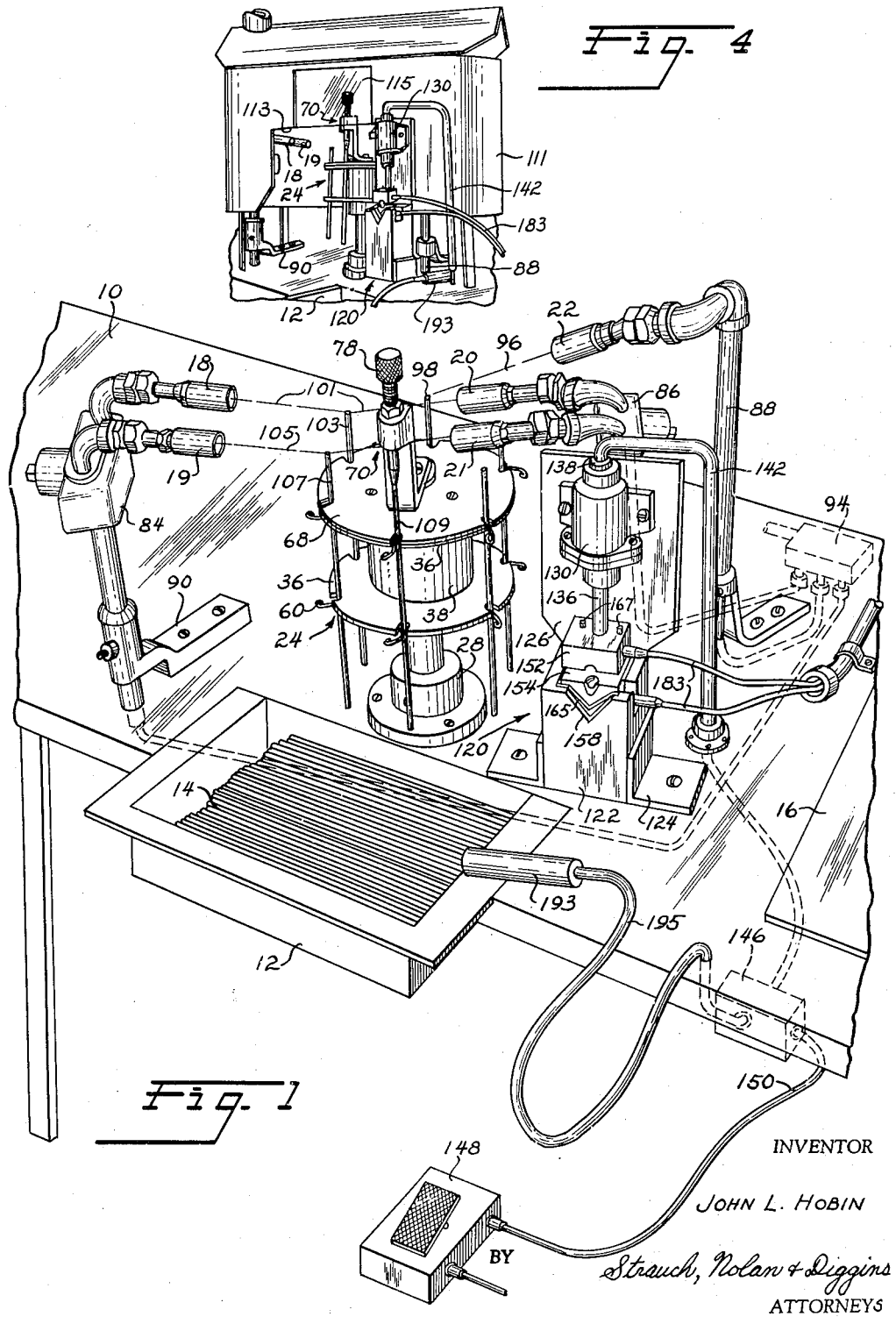
INVENTOR
JOHN L. HOBIN
BY Strauch, Nolan & Diggins
ATTORNEYS Aug. 25, 1959  J. L. HOBIN  2,900,763
APPARATUS FOR THERMOMETER MANUFACTURE
Filed Feb. 28, 1955  3 Sheets-Sheet 2
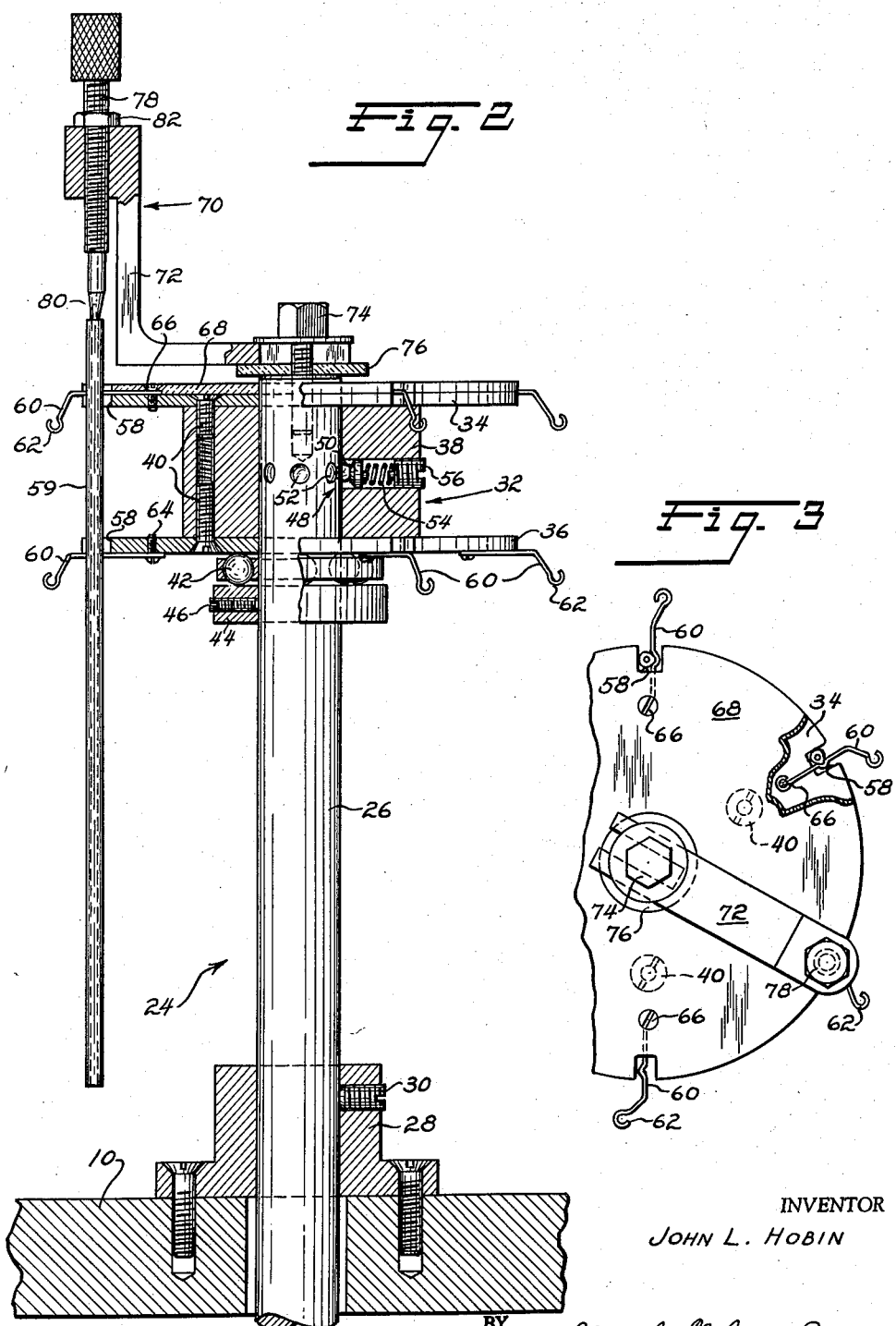
INVENTOR
JOHN L. HOBIN
BY Strauch, Nolan & Diggins
ATTORNEYS

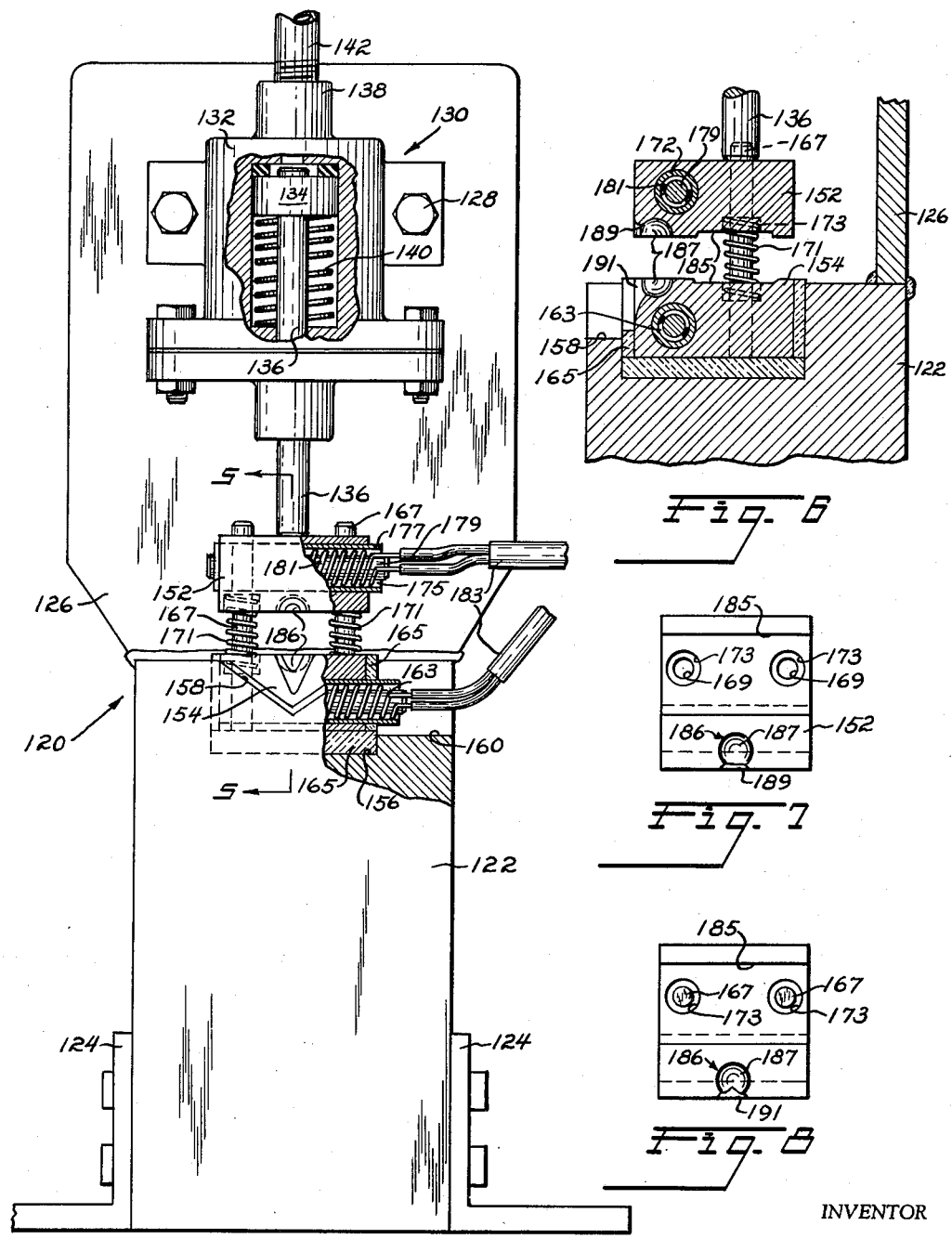

United States Patent Office 2,900,763
Patented Aug. 25, 1959

2,900,763
APPARATUS FOR THERMOMETER MANUFACTURE

John L. Hobin, Springfield, Ohio

Application February 28, 1955, Serial No. 491,072

4 Claims. (Cl. 49—7)

This invention relates to the manufacture of bulbed tubes for thermometers and similar applications, and more particularly to improvements in apparatus for forming integral bulbs on glass tubing for use in liquid column thermometers and the like.

It is the usual practice for thermometer manufacturers to obtain blank thermometer tubing from any of a number of glass companies which make available a wide selection of glass tubing of various cross-sectional forms and different inside and outside diameters. The thermometer manufacturer then cuts or breaks the tubing to desired length, and blows or otherwise forms on one end of each thermometer tube blank an integral glass bulb which must be of predetermined volumetric capacity dependent on the inside diameter of the tubing, the liquid to be used and the temperature range in which the thermometer is to operate. This bulb forming operation has as heretofore practiced constituted a particularly costly and troublesome phase of thermometer production, and it is the aim of the present invention to provide methods and apparatus by which the expense and difficulty of this operation may be minimized.

In the past, thermometer bulbs usually were formed simply by manual manipulation and blowing of the previously heated tube blank, the operation being carried out either with or without the aid of gauging devices for measuring the size of the bulb formed. This operation requires skilled artisans for its practice, and because of its difficult and time-consuming nature is not adapted to mass production techniques. Moreover, the finished bulbs normally vary widely in volumetric capacity, which leads to difficulties in thermometer calibration and an undesirably high percentage of rejects.

Automatic and semi-automatic machines for bulb production have found wide use in the incandescent light and similar industries, but none to my knowledge has proven satisfactory for thermometer bulb manufacture. Aside from the mechanical complexity and resultant high cost of these machines, probably the principal reason for their lack of acceptance in this application is their failure to produce satisfactory bulbs in the small sizes and with the uniformity of size required for thermometer use. Moreover, conventional automatic bulb molding machines if scaled down and adapted to production of thermometer bulbs generally cannot accommodate normal commercial variations in the diameter of tubing blanks of given nominal size without excessive breakage of oversize tubes, and accordingly require careful sizing of the tubing before insertion into the machine.

Various bulb forming methods and apparatus embodying certain of the features of automatic machines but requiring manual operations as well, also have been proposed as, for example, in U.S. Patent No. 1,793,997 to Chaney.

The present invention relates to apparatus of the general type disclosed in this patent, but characterized by greatly improved facility of operation, ability to accommodate commercial variations in tubing diameters, better accuracy and uniformity in size of the thermometer bulbs formed, and capability of practice by persons having little or no training or skill in the glass blowing art. In accordance with the invention, these objectives are attained by use of tube heating means providing precise control of heating of the tube blank prior to the bulb forming operation, and by use of bulb molding means comprising a pair of cooperating die elements, preferably each provided with heating means, which act not only to shape the bulb, as in prior proposals, but also to size it to predetermined volumetric capacity and to do so with little if any dependence on the skill or judgment of the operator. The tube heating and bulb molding means of the invention cooperate in that heating of only a predetermined portion of the length of the tube blank, and its heating to a particular temperature, are highly desirable in obtaining bulb walls molded to desired uniform thickness and also in preventing, during the molding operation, bulb breakage due to excessively low temperature or distortion of the tube outside the mold due to excessively high temperature.

Accordingly, it is a primary object of this invention to provide new and improved apparatus for manufacture of bulbed tubes for thermometers and the like.

Another major object of the invention is the provision of novel apparatus for forming integral bulbs on glass tubing for use in liquid column thermometers and the like.

A further object is the provision of new and improved means for molding bulbs onto the ends of the tube blanks thus heated.

It is another object of the invention to provide new and improved thermometer bulb molding apparatus including mating die elements for molding bulbs of predetermined shape and volumetric capacity.

Still another object is the provision of novel apparatus for forming glass thermometer tube and like bulbs utilizing mating die elements for molding the bulbs to desired size and shape regardless of normal commercial variations in the diameter.

It is a further object of the invention to provide new and improved die elements for bulb molding apparatus, and also to provide such elements embodying heating means for maintaining the elements at desired elevated temperature.

These and other objects, features and advantages of the invention will become more fully apparent by reference to the appended claims and the following detailed description when read in conjunction with the accompanying drawings, wherein:

Figure 1 is a perspective view of a preferred form of bulb forming apparatus in accordance with the invention;

Figure 2 is a diametral section through the tube blank holding and indexing turret fixture of the apparatus of Figure 1;

Figure 3 is a fragmentary plan view of the turret fixture of Figure 2, with parts broken away to show details of construction;

Figure 4 illustrates a vapor and heat dissipating hood suitable for use with the apparatus of Figure 1;

Figure 5 is an elevation of the bulb molding fixture of the apparatus of Figure 1;

Figure 6 is a section on the line 5—5 of Figure 5; and

Figures 7 and 8 are detail views showing the lower and upper mold elements, respectively, of the bulb molding fixture of Figure 4.

With continued reference to the drawings, wherein like reference numerals are used throughout to designate like elements, Figure 1 illustrates the general layout of one operator's station and its component apparatus for thermometer bulb production in accordance with the invention.

As shown in Figure 1, the several components of the apparatus together constituting one operator's station are assembled on and fixed to a bench or work table 10 of suitable size and height convenient to the operator. Work table 10 preferably includes a centrally disposed bin or tray 12 in which may be placed a quantity of thermometer tube blanks 14 to provide a source of work material readily accessible to the operator, and a tray or sheet 16 of suitable heat resistive material such as asbestos may be provided as shown at one side of the apparatus on which finished tubes may be placed to cool following the bulb forming operation.

This operation requires, for the reasons explained above, that heating of the end of the tube blank on which the bulb is to be formed be controlled in precise manner both as to the portion of the tube length heated and as to the temperature to which it is heated. This necessary control is obtained in accordance with the invention by use of a plurality of generally horizontally disposed gas jets 18–22 arranged as more fully described hereinafter, these gas jets providing a flame pattern of predetermined configuration through which the tube blanks are indexed, in step-by-step fashion, as by the tube holding and indexing turret designated generally by reference numeral 24 in Figure 1 and illustrated in detail in Figures 2 and 3, to which reference will now be made.

As shown in Figure 2, turret fixture 24 may comprise a vertically disposed support rod or shaft 26 having its lower portion slidably received in a pedestal 28, the pedestal being bolted or otherwise suitably mounted to work table 10 over a bore therethrough accommodating the lower end of the shaft. A set screw 30 may be provided for locking shaft 26 in pedestal 28 in vertical adjusted position convenient to the operator.

Rotatably journaled on the stationary shaft 26 is a thermometer tube holding assembly 32, shown as comprising upper and lower discs 34 and 36 held in mutually spaced relation as by a spacer member 38 to which the discs 34 and 36 are secured by suitable means such as the bolts 40 shown. The lower disc 36 of the tube blank holding assembly is supported in proper position on shaft 26 by a thrust bearing 42 preferably of ball type as illustrated, which in turn is supported by a thrust collar 44 fixed on shaft 26 as by a set screw 46.

A spring loaded detent assembly 48 may be provided for indexing the tube blank holding assembly to a plurality of angularly related positions each corresponding to one of the tube blank treatment stages. This detent assembly may comprise a plunger element 50 slidable in a transverse bore in spacer member 38 and urged into operative relationship with a series of equiangularly spaced arcuate depressions or stops 52, drilled or otherwise formed in the peripheral surface of shaft 26, by a loading spring 54 held in position in spacer member 38 as by a threaded plug 56 closing the transverse bore therein.

Upper and lower discs 34 and 36 of the tube holding assembly 32 have formed in the periphery thereof a plurality of notches or recesses 58 of width sufficient to allow insertion of thermometer tube blanks, which generally are of rounded triangular section as shown at 59 in Figure 3, into the recesses. The disc recesses 58 are equal in number to the stops 52 in detent assembly 48, and they are equally spaced about the peripheries of the discs with the recesses in the upper disc 30 in vertical alignment with those in lower disc 32.

For securely holding the tube blanks properly positioned in recesses 58 and permitting easy removal on completion of the tube heating operation, suitable fastening means such as the spring clips 60 may be employed. These clips preferably are formed of resilient wire or other spring stock bent to substantially the shape illustrated, which may provide a handle portion 62 for convenience of manipulation by the operator though as is believed apparent the shape of the clips shown is such that manual manipulation is not essential to insertion or removal of tube blanks. Spring clips 60 may be fixed to lower disc 36 as by bolts 64 and fixed to the upper disc 34 by bolts 66 also securing a sheet 68 of asbestos or similar heat resistive material to the upper surface of the disc for protecting it against direct exposure to the gas jets.

Shown as fixedly mounted to the upper end of the stationary support shaft 26 in Figure 2 is a tube end locating assembly 70 comprising a generally L-shaped bracket member 72 fixed to shaft 26 as by a bolt 74 through the base of the bracket member and an underlying insulating washer 76 into a threaded bore in shaft 26. Bracket member 72 has threadedly engaged in a bore therein a vertically disposed locating screw 78 preferably having a knurled head as shown and a downwardly depending conical end portion or stop 80 vertically adjustable by rotation of the screw. The threads of locating screw 78 preferably are of micrometer type to provide fine adjustment of the position to stop 80, and a lock nut 82 may be provided for locking the locating screw and its stop in adjusted position. Before tightening down the bolt 74 securing bracket member 72 to shaft 26, the bracket member is rotated to a position such that the locating screw 78 carried thereby is positioned directly over the one of recesses 58 in discs 30 and 32 of the tube holding assembly selected to be the loading station at which tube blanks are to be inserted into the assembly. Bolt 74 then is turned down to lock the bracket member 72 of tube end locating assembly 70 fixedly in position.

In use, the operator inserts a fresh tube blank into the tube holding assembly at the one of its indexed positions selected as the loading station, and in doing do assures proper vertical location of the tube blank by abutting it upwardly against the lower end 80 of locating screw 78, which because of its conical form locates the tube from its bore rather than from any "flash" or other irregularity on the tube end. The tube blank then is indexed through its several treatment stages by rotating (counterclockwise in Fig. 3) tube holding assembly 32, which carries the tube blank through the heating cycle now to be explained.

With reference again to Figure 1, two of the gas jets 18 and 19 are shown mounted to a common manifold 84. Two others, 20 and 21, are mounted to a second manifold 86, and the remaining gas jet 22 is mounted individually to a pedestal or support tube 88. The manifolds 84 and 86 preferably are both provided with adjustable support means such as the clamping bracket 90 shown supporting manifold 84 for limited vertical and angular adjustment with respect to work table 10, and similar adjustment means 92 may be provided for gas jet 22 and its support tube 88. Additional adjustment of the flame pattern produced by the several gas jets may be provided by universal joints at the points of connection of the flame tubes into their manifolds or support fittings, as is conventional in gas jets of the type illustrated. Suitable conduit means for supplying a gas-air mixture to the two manifolds 84 and 86 and to support tube 88 are shown, in dotted lines in Figure 1, as connected to a common combustible gas manifold 94, which preferably is located below work table 10 and supplied with a gas-air mixture at controlled pressure by suitable mixing and pressure control devices (not shown).

As indicated by dotted line 96 in Figure 1, gas jet 22 is arranged to direct its flame on the upper end of the thermometer tube blank 98 then indexed to and occupying the position directly opposite the loading position of turret 24. This jet 22 constitutes the pre-heating stage of the tube heating cycle, the tube blanks not being subjected to the direct heat of any of the gas jets when in loading position or the subsequent indexed positions through which they move before reaching the position occupied by tube blank 98.

Gas jets 18 and 20 are as shown by dotted lines 101 in Figure 1 arranged to converge on the end of tube blank 103 next following the pre-heating stage, and gas jets 19 and 21 are as shown by dotted lines 105 arranged to converge on tube blank 107 occupying the final heating stage.

As noted, the single flame of gas jet 22 functions to pre-heat the initially cold tube blanks gradually, before they are subjected to the full heat of two gas jets 18 and 20 in the next following heating stage and two jets 19 and 21 in the final heating stage, wherein flame impinges on both sides of the tube blank. Because only a single get jet is employed in the pre-heat stage, this jet preferably is positioned at relatively high elevation as shown and directed downwardly on the tube blank end, thus assuring better distribution of flame over the tube for more uniform heating thereof.

In the two full heating stages it is preferred for optimum control of tube heating to concentrate the flame pattern so as to be restricted to impingement only on the tube blank ends, and in accordance with the invention this objective is attained by arranging the gas jets 18–21 substantially horizontally as shown and maintaining the tube blanks vertically disposed and beneath the jet flames during their movement through the flame.

The exact temperature to which the tube blank ends are heated depends on the type of glass being used and the desired thickness of the wall of the bulb to be later formed in the heated tube end, final temperature being controlled by varying the positions of the gas jets or the rate of flow of fuel thereto. It also is possible to control tube temperature by variation of the length of time each tube is permitted to remain in the various heating stages. I have found, however, that effects of this variable may be minimized by proper arrangement and control of the gas jets, and it generally is preferred to do so in order to make the heating operation independent of operator judgement insofar as possible.

In all cases, the tube blanks are heated to temperatures such that the heated ends fuse and close, as is necessary for the subsequent bulb molding operation. For tube blanks of the type commonly used in low range mercury thermometers, and spirit thermometers, for example, this requires that a temperature of about 650° C. be attained.

The tube blanks may be removed from tube holding turret 24 when the heated blank still is in its final heating position as at 107, a cold tube blank 109 being simultaneously inserted into the turret at its loading position under tube end locating assembly 70, and the turret 24 then indexed to bring the next tube 103 into final heating position and to start the cold tube 109 through its heating cycle. Alternatively, both unloading and loading may be carried out, successively, at the turret loading position. In either case, the hot tube blank just removed from turret 24 is immediately transferred to the bulb forming apparatus and there treated in a manner later to be described.

Preferably, the turret 24 and its associated gas jets 18–22 all are enclosed within a heat and vapor dissipating hood as shown at 111 in Figure 4, the hood being provided with an opening 113 providing access to turret 24 for loading and unloading, a window 115 permitting observation of the heating operation, and a suction fan (not shown) for drawing off heat and noxious vapors from within the hood.

Turning now to the structure and operation of the bulb molding fixture designated generally by reference numeral 120 in Figure 1 and shown in detail in Figures 5–8, this fixture may comprise a relatively massive base or anvil 122 fixed as by brackets 124 to work table 10, preferably in close proximity to the unloading station of tube holding turret 24 so as to reduce to a minimum the time necessary for transfer of heated tube blanks from the turret to the bulb molding fixture.

A vertically disposed support plate 126 welded or otherwise suitably secured to anvil 122 has fixed thereto by bolts 128 a small pneumatic press unit 130 which may be of conventional type as illustrated in Figure 5. As there shown, this unit comprises a cylinder 132 having a bore in which reciprocates a piston 134 operable to drive piston rod 136 downwardly on application of air pressure above the piston through an inlet fitting 138 formed in the upper end of cylinder 132. A spring 140 may be provided for returning the piston to initial position on release of air pressure. An air supply line 142 is shown connected at one end into inlet fitting 138 and at its other end into a T-fitting or manifold 146, the manifold being conveniently mounted beneath the work table 10. Air supply to manifold 146 is controlled by an operator actuated valve 148 which is interposed in the air supply line 150 to manifold 146 and which preferably is of foot operated treadle type as illustrated.

Pneumatic press unit 130 operates, when actuated by manipulation of treadle valve 148, to bring together upper and lower die elements 152 and 154, respectively, which have formed in the opposing surfaces thereof mating mold cavities as hereinafter more fully described. The lower die element 154 is as shown received within a rectangularly shaped recess 156 formed in the upper end of anvil 122, the front and one side wall of the anvil defining this recess being cut away as shown at 158 and 160, respectively, to provide convenient access to the die element therein, for facilitating insertion and removal of heated tube blanks and of a mold heater 163 for the lower die element. Preferably, the die element 154 is heat insulated from the walls of anvil 122 which enclose it, this being effected as by strips 165 of asbestos sheet or like insulating material underlying the die element and interposed between its side walls and the enclosing walls of anvil 122.

The upper die element 152 is mounted to the lower element 154 for mold opening and closing movement guided by a plurality of guide stems 167, two being illustrated, which are press-fitted or otherwise fixedly secured in the lower die element 154 and are freely slidable in bores 169 in the upper die 152. Return springs 171 preferably are provided for biasing the upper die to mold open position, the ends of the return springs being seated in counterbores 173 in the upper and lower die elements as shown.

As noted above, the lower die element 154 may be provided with a mold heating element 163 and a similar heating element 175 preferably is provided for the upper die element 152. These heating elements serve to maintain the die elements at elevated temperature, to thus minimize thermal shock and breakage of tube blanks inserted into the mold, and also to delay cooling of the tube ends to temperatures below those necessary for bulb formation. The mold heaters may each comprise an insulating sleeve 177 snugly received in a longitudinal bore in the respective die element, the sleeve 177 enclosing a core 179 about which is wound an electrical heating coil 181 energized through power supply lines 183.

As best shown in Figures 6, 7 and 8, the opposing surfaces of die elements 152 and 154 are longitudinally relieved as at 185 for better interfitting without extremely precise machining and finishing, and have formed in their opposing surfaces mating mold cavities 186 for shaping and sizing the bulbs molded therein.

I have found that the configuration and disposition of these mold cavities 186 are critical factors in the successful molding of bulbs to the precise shape and size desired with minimum tube breakage. In accordance with the invention, the mold cavities 186 are formed by drilling or otherwise cutting a recess in the working face of each die, this recess being substantially circular in horizontal section and having its periphery just tangent to the front face of the die. In vertical section, the mold cavities may be either substantially semi-circular as shown in Figure 6 or of any other suitable configuration. The upper and lower mold cavities need not necessarily be alike in vertical section as illustrated, but may differ from each other with one being semi-circular and the other flat-bottomed, for example.

The mold cavity wall 187 thus formed in the upper die element 152 has, at its point of tangency with the front face of the die, a cut away portion or notch 189 produced as by filing or equivalent machine operation. A notch 191 is similarly cut at the point of tangency of mold cavity wall 187 in the lower die with the front face thereof. With thermometer tube blanks of cross-sectional shape as illustrated, that is of generally triangular section with a rounded back surface, the notch 189 in the front face of the upper die 152 preferably is rounded complementarily to the rounded back surface of the tube blanks, and the notch 191 cut in lower die 154 is of relatively sharp V form complementary to the sharply angled front surface of the tube blanks to provide an entrance to the mold cavities having confining ridges surrounding the entrance. This notch 191 in lower die 154 also is preferably relatively deeply cut, as compared to that in the upper die, as I have found that this greatly improves the ability of the die elements to accommodate tube blanks of varying outside diameters.

With reference again to Figure 1, the foot operated valve 148 in air line 150 to air fitting or manifold 146, through which air is supplied to pneumatic press 130 for actuation thereof, also controls air supply to a flexible tube or hose 195 having an end fitting 193 into which the operator may manually insert the cold end of a tube blank on removal thereof from tube heating turret 24. Air under pressure thus may be supplied to the interior bore in the heated tube blank simultaneously with application of air pressure to pneumatic press 130, air pressure application being controlled by the operator in the manner now to be described.

The operator inserts cold tube blanks into the turret 24 and removes heated blanks therefrom in the manner described in the foregoing. He then inserts the unheated end of the blank into hose fitting 193 and, using the fitting as a handle for the tube, locates the heated end thereof over the mold cavity 186 in lower die 154. Foot treadle 148 then is manipulated by the operator to cause pneumatic press 130 to close together the die elements, and to inject air under pressure into the heated tube blank to inflate its hot, plastically deformable end section outwardly into engagement with the walls of the mold cavity. Mold heaters 163 and 175 serve to prevent thermal shock and unduly rapid cooling of the hot tube blank on closing of the mold, but do permit relatively slow cooling to temperatures at least slightly below the fusion temperature of the glass of the tubing. Accordingly, after formation of a bulb on the tubing end it is permitted to remain in the mold for a few moments until its temperature falls below the fusion point of the glass; air pressure then is released and the completed tube removed from the mold and transferred to asbestos sheet 16 (Fig. 1) for cooling to room temperature.

The confining ridges formed at the lines of junction of notches 189 and 191 in die elements 152 and 154 (Figs. 6-8) with the mold cavities therein serve to prevent plastic flow of glass from within the mold cavities to the exterior of the mold when subjected to air pressure, and at the same time serve to accommodate commercial variations in diameter of the tube blanks. This latter function results primarily from the fact that the confining ridges engage only the portion of the tube blank which has been heated to plastic or semi-plastic state and thus is capable of deformation if necessary to conform to the confining ridges. Since these confining ridges have substantially line contact with the tube blanks and thus do not provide complete protection against deformation of portions of the tubes outside the mold which have been heated to excessively high temperature, the importance of carefully controlled tube heating in accordance with the invention is apparent.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Thermometer bulb molding apparatus adapted to accommodate commercial variations in diameter of thermometer capillary tube blanks comprising a pair of separable die elements having complementary cavities therein defining a bulb mold having an entrance defined by relatively sharply sloped confining ridges for providing substantially a line contact with said tube blanks for minimizing breakage of oversize tube blanks and plastic deformation of undersize blanks, and means for closing together said die elements and substantially simultaneously injecting air under pressure into the heated tube blank end enclosed in the mold cavity therein for shaping and sizing the bulb formed.

2. Apparatus as defined in claim 1 wherein said means for closing the die elements together comprises a pneumatic press cooperable with said die elements, a pressure fitting with which the unheated end of the tube blank may be engaged, and valve means controlling air pressure supply to said press and fitting.

3. Glass thermometer bulb molding apparatus for molding a hollow bulb on an end of a capillary tube comprising a pair of mating die elements having walls forming complementary cavities therein defining a bulb mold, each of said mold cavities being substantially tangent to a front face of the respective die element as viewed normal to the mating surface thereof, said front face being cut away at the point of tangency to provide an entrance to the mold cavities having confining ridges surrounding the entrance thus provided, said confining ridges having a configuration conforming to the contour of the tube and being sloped to provide substantially a peripheral line contact with said tube.

4. Thermometer bulb molding apparatus adapted to accommodate commercial variations in diameter of thermometer capillary tube blanks comprising a pair of separable die elements having walls forming complementary cavities therein defining a bulb mold, a front face on said die elements and one portion of said cavity walls having tangent portions, said front face and said walls being cut away at the tangent portions to form an only entrance to said cavities defined by relatively sharply sloped confining ridges, said confining ridges having a configuration conforming to the contour of the tube and being sloped to provide substantially a peripheral line contact with said tube for minimizing breakage of oversize tube blanks and plastic deformation of undersize blanks.

References Cited in the file of this patent

UNITED STATES PATENTS

| Number | Name | Date |
| --- | --- | --- |
| 6,694 | Scott | Sept. 4, 1849 |
| 275,730 | Swan | Apr. 10, 1883 |
| 1,294,319 | Stewart | Feb. 11, 1919 |
| 1,462,362 | Bohner | July 17, 1923 |
| 1,473,675 | Halverson | Nov. 13, 1923 |
| 1,532,077 | Quackenbush et al. | Mar. 31, 1925 |
| 1,565,849 | Durand | Dec. 15, 1925 |
| 1,793,997 | Chaney | Feb. 24, 1931 |
| 1,809,854 | Koering | June 16, 1931 |
| 1,859,011 | Wales | May 17, 1932 |
| 1,940,223 | Most | Dec. 19, 1933 |
| 2,103,585 | Kimble et al. | Dec. 28, 1937 |
| 2,159,736 | Geiger et al. | May 23, 1939 |
| 2,285,181 | Wines | June 2, 1942 |
| 2,410,616 | Webb | Nov. 5, 1946 |
| 2,515,093 | Mills | July 11, 1951 |
| 2,711,055 | Majkrzak et al. | June 21, 1955 |